(12) United States Patent
Lin et al.

(10) Patent No.: US 9,326,394 B2
(45) Date of Patent: Apr. 26, 2016

(54) DUAL SCREEN ELECTRONIC DEVICE AND DETACHABLE DISPLAY MODULE THEREOF

(71) Applicant: E Ink Holdings Inc., Hsinchu (TW)

(72) Inventors: Chin-Wen Lin, Hsinchu (TW); Chien-Chung Huang, Hsinchu (TW); Su-Cheng Liu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 328 days.

(21) Appl. No.: 13/940,198

(22) Filed: Jul. 11, 2013

(65) Prior Publication Data

US 2014/0063758 A1 Mar. 6, 2014

Related U.S. Application Data

(60) Provisional application No. 61/696,221, filed on Sep. 2, 2012.

(30) Foreign Application Priority Data

Jan. 2, 2013 (TW) .............................. 102100033 A (51) Int. Cl.
*G06F 1/16* (2006.01)
*H05K 5/00* (2006.01)
*H04M 1/02* (2006.01)

(52) U.S. Cl.
CPC ............ *H05K 5/0017* (2013.01); *G06F 1/1647* (2013.01); *G06F 1/1654* (2013.01); *H04M 1/0283* (2013.01); *H04M 1/0235* (2013.01); *H04M 2250/16* (2013.01)

(58) Field of Classification Search
CPC .... G06F 1/1654; G09G 3/344; G09G 3/3446; H05K 5/0017

USPC .................................................... 361/679.29
See application file for complete search history.

(56) References Cited

U.S. PATENT DOCUMENTS

| 5,293,528 A | * | 3/1994 | DiSanto | .................. G02F 1/167 345/107 |
| 6,118,426 A | * | 9/2000 | Albert | ........................ B41J 2/01 315/150 |

(Continued)

FOREIGN PATENT DOCUMENTS

| CN | 2842521 Y | 11/2006 |
| CN | 101272332 A | 9/2008 |

OTHER PUBLICATIONS

Corresponding Taiwanese Office Action that these art references were cited on Aug. 10, 2015.

(Continued)

*Primary Examiner* — Adrian S Wilson
(74) *Attorney, Agent, or Firm* — CKC & Partners Co., Ltd.

(57) ABSTRACT

A dual screen electronic device includes a main device having a first casing and a display screen, and a detachable display module. The first casing has a first opening. The display screen is located on the first casing and exposed from the first opening. The detachable display module includes a second casing, a power supply module, an electrophoretic display (EPD) module, and a control module. The second casing is detachably positioned on the first casing, and has a second opening. The power supply module is arranged on the second casing. The EPD module is fixed to the second casing, or is detachably positioned on the second casing, and has a display region exposed from the second opening. The control module is selectively located on the second casing or on the EPD module, and is electrically connected to the EPD module and the power supply module.

12 Claims, 12 Drawing Sheets

(56) References Cited

U.S. PATENT DOCUMENTS

| | | | |
|---|---|---|---|
| 6,778,383 B2 | 8/2004 | Ho | |
| 7,079,119 B2 | 7/2006 | Hanson et al. | |
| 7,277,219 B2 * | 10/2007 | Ikeda | G09G 3/3446 345/107 |
| 7,595,979 B2 * | 9/2009 | Shi | G06F 1/1637 248/924 |
| 7,990,338 B2 * | 8/2011 | Teng | G06F 1/1616 345/1.3 |
| 2003/0160754 A1 | 8/2003 | Hanson et al. | |
| 2007/0090247 A1 | 4/2007 | Shi et al. | |
| 2008/0072163 A1 * | 3/2008 | Teng | G06F 1/1616 715/761 |
| 2009/0082067 A1 | 3/2009 | Song | |
| 2010/0156913 A1 | 6/2010 | Ortega et al. | |
| 2010/0238119 A1 | 9/2010 | Dubrovsky et al. | |
| 2011/0007892 A1 | 1/2011 | Jorgensen | |
| 2011/0017634 A1 | 1/2011 | Sweeney | |
| 2011/0090166 A1 | 4/2011 | Truter | |
| 2011/0141083 A1 | 6/2011 | Lu et al. | |
| 2012/0139852 A1 | 6/2012 | Huang et al. | |
| 2012/0194448 A1 | 8/2012 | Rothkopf | |

OTHER PUBLICATIONS

Corresponding Chinese Office Action that these art references were cited on Dec. 17, 2015.

* cited by examiner

DUAL SCREEN ELECTRONIC DEVICE AND DETACHABLE DISPLAY MODULE THEREOF

RELATED APPLICATION

This application claims the priority benefit of provisional application Ser. No. 61/696,221, filed Sep. 2, 2012, the full disclosure of which is incorporated herein by reference. This application also claims the priority benefit of Taiwanese application serial no. 102100033, filed Jan. 2, 2013, the full disclosure of which is incorporated herein by reference.

BACKGROUND

1. Technical Field

The present disclosure relates to a dual screen electronic device and a detachable display module thereof.

2. Description of Related Art

Nowadays, in the market of various consumer electronic products, thin type screens have been extensively utilized in portable electronic devices to be display elements. A portable electronic device is such as a personal digital assistant (PDA), a cellular phone, a global positioning system (GPS), or a tablet computer. A thin type screen is such as an liquid crystal display screen, an organic light emitting diode screen, a bi-stable display device, etc.

An electrophoretic display device is a common bi-stable display device, has flexibility and includes an electronic ink layer with a plurality of microcapsules. Each of the microcapsules has positive and negative charges, and the positive charges and the negative charges have different colors, such as black and white. When an electric field in the electrophoretic display device is changed, the differently colored positive charges and negative charges move upward or downward in accordance with the directions of the electric field. When the white charges are adjacent to a side facing a user, the white charges can reflect an environmental light source to be a bright face. Since the electrophoretic display device can reduce power consumption of a backlight, the electrophoretic display device is often used in an electronic book. Furthermore, a color filter film may be configured on the electronic ink layer. After an incident light is reflected by the white charges, the electrophoretic display device can display colored images through the color filter film.

A housing of a conventional electronic device, such as a rear cover of a cellular phone, is often manufactured by plastic. If the housing has patterns, the patterns are usually formed on an external surface of the housing by printing. As a result, the housing cannot have dynamic patters and so as to be boring.

SUMMARY

An aspect of the present invention is to provide a dual screen electronic device.

In an embodiment of the present invention, a dual screen electronic device includes a main device and a detachable display module. The main device includes a first casing and a display screen. The first casing has a first opening. The display screen is located on the first casing and exposed from the first opening. The detachable display module includes a second casing, a power supply module, an electrophoretic display module, and a control module. The second casing is detachably positioned on the first casing, and has a second opening. The power supply module is arranged on the second casing. The electrophoretic display module is fixed to the second casing or detachably positioned on the second casing. The electrophoretic display module has a display region exposed from the second opening. The control module is selectively located on the second casing or located on the electrophoretic display module. The control module is electrically connected to the electrophoretic display module and the power supply module.

In an embodiment of the present invention, the electrophoretic display module includes a substrate, a plurality of sectional electrodes, a common electrode layer, a display medium layer, and a plurality of electrode pads. The sectional electrodes are located on the substrate and arranged to be a pattern or a word. The display medium layer is located between the common electrode layer and the sectional electrodes. The electrode pads are electrically connected to the sectional electrodes and the common electrode layer.

In an embodiment of the present invention, the detachable display module further includes a signal connection device. The signal connection device is configured on the second casing and electrically connected to the control module for electrically contacting the electrode pads.

In an embodiment of the present invention, the detachable display module further includes a protection film. The protection film is located on the common electrode layer. The protection film has at least one light transmissive pattern portion located above the sectional electrodes.

In an embodiment of the present invention, the display medium layer includes a plurality of microcapsules. Each of the microcapsules has a plurality of bright electrophoretic particles and a plurality of dark electrophoretic particles, such that the pattern or the word displays as a bright face or a dark face.

In an embodiment of the present invention, each of two opposite edges of the first casing has a groove, and each of two opposite edges of the second casing has a protruding rib, and the two protruding ribs are respectively coupled to the two grooves, such that the second casing is slidingly connected to the first casing.

In an embodiment of the present invention, the second casing includes a first sub-portion and a second sub-portion. The first sub-portion has a concave portion. Two ends of the second sub-portion are respectively detachably connected to the first sub-portion, and the second sub-portion is located on an opening position of the concave portion, such that an second opening is formed between the first and second sub-portions.

In an embodiment of the present invention, each of two opposite edges of the concave portion has a groove, and the two grooves are respectively coupled to two opposite edges of the electrophoretic display module, such that the electrophoretic display module is slidingly connected to the first sub-portion.

In an embodiment of the present invention, the first sub-portion has a first board body, a second board body, and a third board body, and the first, second, and third board bodies surround the concave portion, and the first board body is parallel to the second board body.

In an embodiment of the present invention, the first sub-portion has a plurality of positioning through holes located on the first and second board bodies, and the second sub-portion has a plurality of positioning pillars, and the positioning pillars respectively insert into the positioning through holes.

In an embodiment of the present invention, the first sub-portion has a plurality of positioning protruding points located on the first and second board bodies, and the second sub-portion has a plurality of fastening hooks, and the fastening hooks are respectively fixed to the positioning protruding points.

In an embodiment of the present invention, the control module comprises a micro control unit and a driving unit.

Another aspect of the present invention is to provide a detachable display module assembled to a main device. The main device has a first casing and a display screen. The display screen is located on the first casing and exposed from the first opening of the first casing.

In an embodiment of the present invention, the detachable display module includes a second casing, a power supply module, an electrophoretic display module, and a control module. The second casing is detachably positioned on the first casing, and the second casing has a second opening. The power supply module is arranged on the second casing. The electrophoretic display module is fixed to the second casing or detachably positioned on the second casing. The electrophoretic display module has a display region exposed from the second opening. The control module is selectively located on the second casing or located on the electrophoretic display module. The control module is electrically connected to the electrophoretic display module and the power supply module.

In the aforementioned embodiments of the present invention, when the electrophoretic display module is fixed to the second casing, since the second casing of the detachable display module is detachably positioned on the first casing of the main device, the pattern or the word displayed by the electrophoretic display module can be changed by changing another detachable display module. Moreover, when the electrophoretic display module is detachably positioned on the second casing, the whole detachable display module does not need to be changed, only the electrophoretic display module located on the second casing needs to be changed, so as to achieve a purpose for changing the pattern or the word displayed by the electrophoretic display module. Furthermore, since the light transmissive pattern portion of the protection film is located above the sectional electrodes, when the display medium layer of the electrophoretic display module displays as a bright face in accordance with positive and negative levels of the sectional electrodes, the pattern or the word arranged by the sectional electrodes can be seen outside the light transmissive pattern portion.

Compared with a conventional plastic housing having a printing pattern, the detachable display module can display the pattern or the word with variations of bright and dark, so that the detachable display module is more vivid. In addition, the pattern or the word can be easily changed by changing the detachable display module or the electrophoretic display module of the detachable display module.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
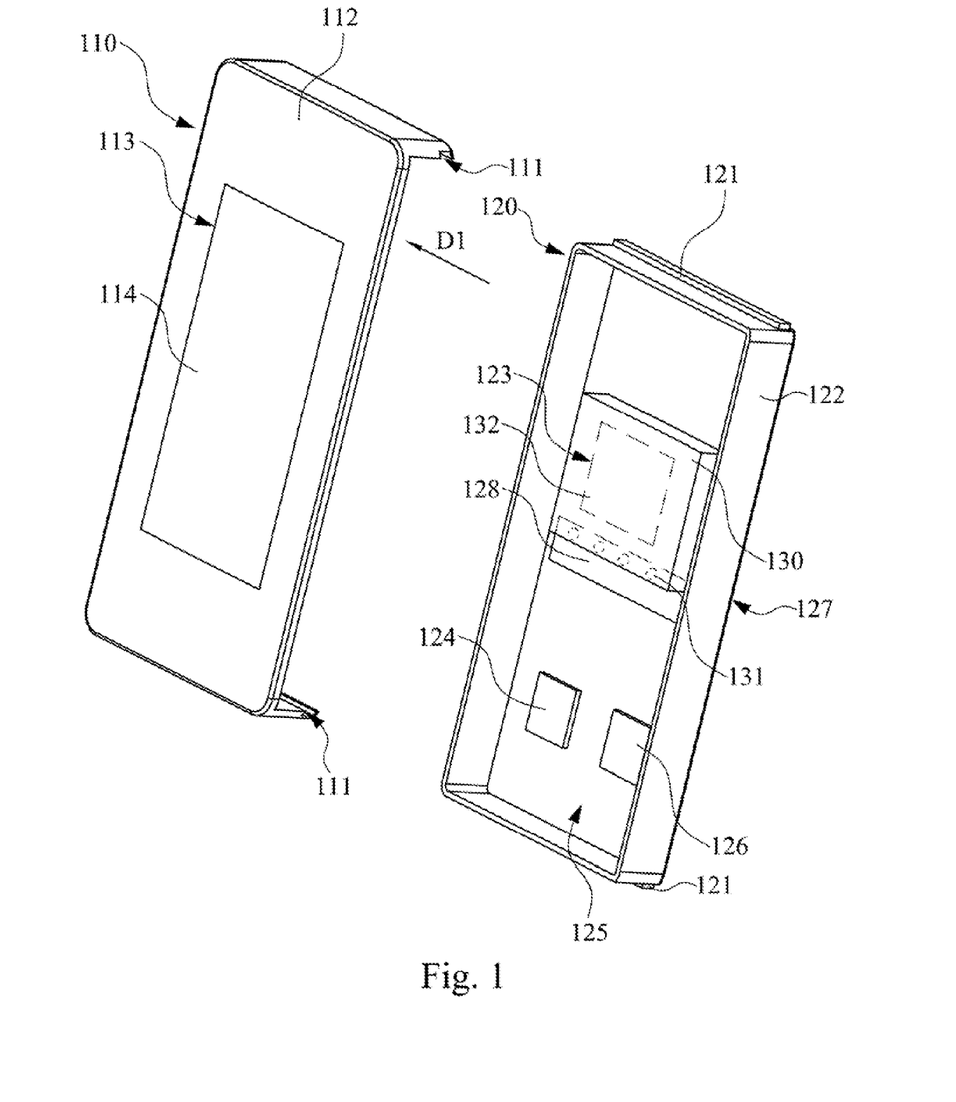
FIG. 1 is an exploded view of a dual screen electronic device according to an embodiment of the present invention.
Figure 2:
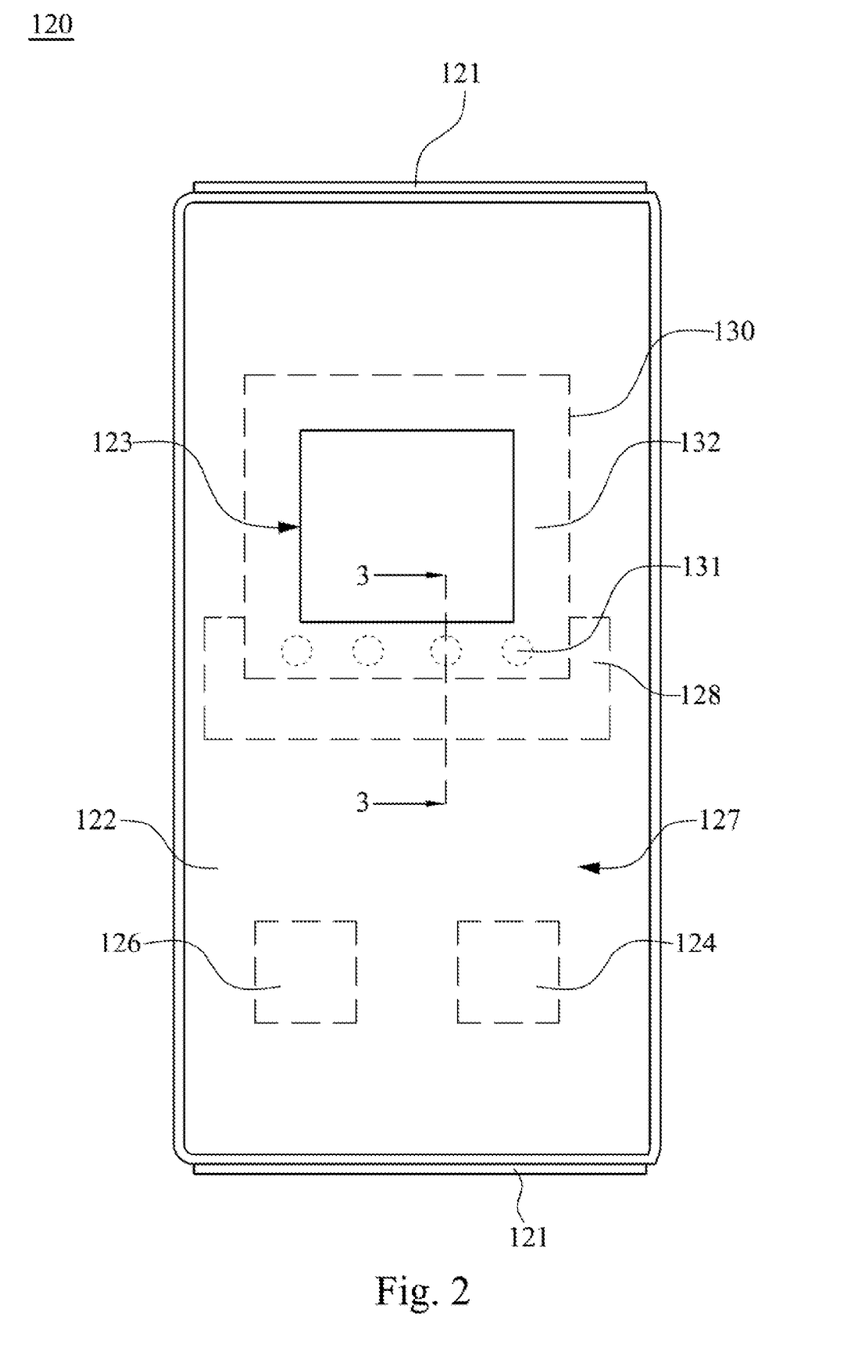
FIG. 2 is a front view that is seen from an external surface of a detachable display module shown in FIG. 1.

FIG. 1 is an exploded view of a dual screen electronic device 100 according to an embodiment of the present invention. FIG. 2 is a front view that is seen from an external surface 127 of a detachable display module 120 shown in FIG. 1. As shown in FIG. 1 and FIG. 2, the dual screen electronic device 100 includes a main device 110 and the detachable display module 120. The main device 110 includes a first casing 112 and a display screen 114. The first casing 112 has a first opening 113. The display screen 114 is configured on the first casing 112 and exposed from the first opening 113.

The detachable display module 120 includes a second casing 122, a power supply module 124, an electrophoretic display module 130, and a control module 126. The second casing 122 is detachably positioned on the first casing 112, and has a second opening 123. The power supply module 124 is arranged on an internal surface 125 of the second casing 122. The electrophoretic display module 130 has a display region 132 exposed from the second opening 123. The control module 126 is electrically connected to the electrophoretic display module 130 and the power supply module 124. In this embodiment, the electrophoretic display module 130 may be fixed to the internal surface 125 of the second casing 122 by an adhesive, and the control module 126 is located on the internal surface 125 of the second casing 122. However, in another embodiment (to be described in FIG. 6), the electrophoretic display module 130 may also be positioned on the second casing 122, and the control module 126 may also be configured on the electrophoretic display module 130.

In addition, the main device 110 may be a cellular phone, a tablet computer, or a digital photo frame. The detachable display module 120 may be a rear cover of the cellular phone, the tablet computer, or the digital photo frame. The display screen 114 may be a liquid crystal display (LCD) screen, a light emitting diode (LED) screen, an organic light emitting diode (OLED) screen, or a bi-stable display as deemed necessary by designers. Furthermore, the power supply module 124 may include a lithium battery, a nickel-metal hydride battery, or a solar cell, but the present invention is not limited in this regard. The control module 126 may include a micro control unit (MCU) and a driving unit.

Figure 3:
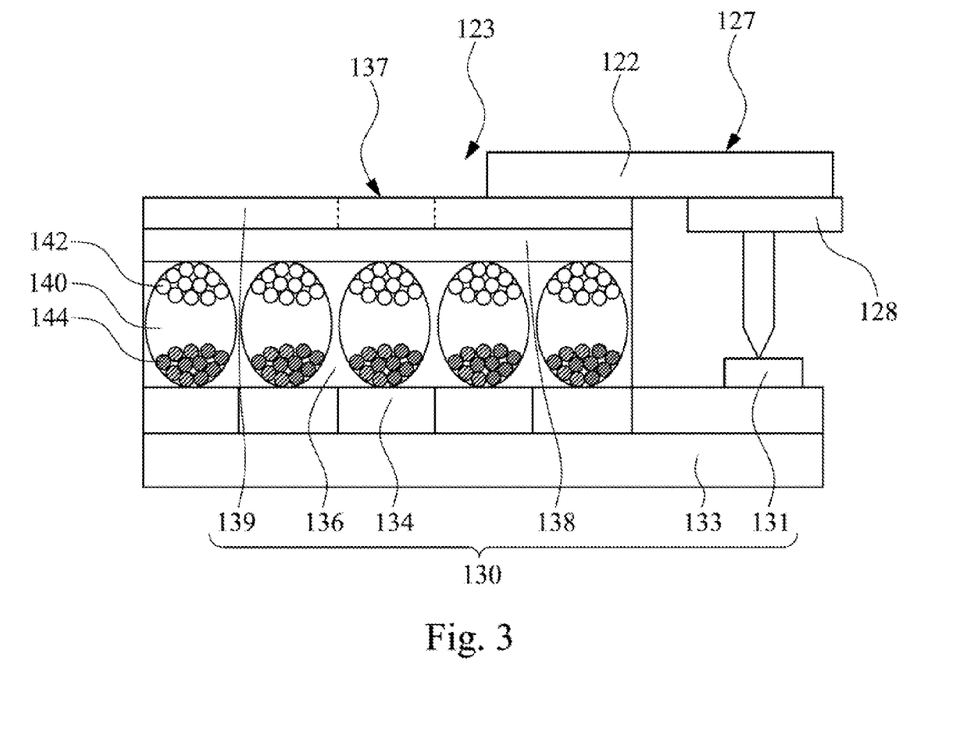
FIG. 3 is a cross-sectional view of the detachable display module taken along line 3-3 shown in FIG. 2.

FIG. 3 is a cross-sectional view of the detachable display module 120 taken along line 3-3 shown in FIG. 2. As shown in FIG. 2 and FIG. 3, the electrophoretic display module 130 includes a substrate 133, a plurality of sectional electrodes 134, a common electrode layer 138, a display medium layer 136, a plurality of electrode pads 131, and a protection film 139. The sectional electrodes 134 are located on the substrate 133 and arranged to be a pattern or a word. The display medium layer 136 is located between the common electrode layer 138 and the sectional electrodes 134. The display medium layer 136 includes a plurality of microcapsules 140. Each of the microcapsules 140 has a plurality of bright (e.g., white color) electrophoretic particles 142 and a plurality of dark (e.g., black color) electrophoretic particles 144, such that the pattern or the word arranged by the sectional electrodes 134 can be displayed as a bright face or a dark face. The electrode pads 131 are electrically connected to the sectional electrodes 134 and the common electrode layer 138. The protection film 139 is configured on the common electrode layer 138, and has a light transmissive pattern portion 137 located above the sectional electrodes 134.

Moreover, the detachable display module 120 may further include a signal connection device 128. The signal connection device 128 is configured on the second casing 122 and electrically connected to the control module 126. In this embodiment, the signal connection device 128 electrically contacts the electrode pads 131 by pins.

In use, the power supply module 124 provides electric power to the control module 126 and the electrophoretic display module 130, an electric field between the common electrode layer 138 and the sectional electrodes 134 can be changed by the control module 126, such that the bright electrophoretic particles 142 or the dark electrophoretic particles 144 are adjacent to an upper side (i.e., a side adjacent to the protection film 139). When the bright electrophoretic particles 142 are adjacent to the upper side and the dark electrophoretic particles 144 are adjacent to a under side (i.e., a side facing away from the protection film 139), the electrophoretic display module 130 can reflect an environmental incident light so as to display as a bright face (e.g., white color). On the contrary, when the bright electrophoretic particles 142 are adjacent to the under side and the dark electrophoretic particles 144 are adjacent to the upper side, the electrophoretic display module 130 cannot reflect the environmental incident light so as to display as a dark face (e.g., black color).

In this embodiment, a shape of the light transmissive pattern portion 137 of the protection film 139 may be the pattern and the word arranged by the sectional electrodes 134. Since the light transmissive pattern portion 137 of the protection film 139 is located above the sectional electrodes 134, when the display medium layer 136 displays as a bright face in accordance with positive and negative levels of the sectional electrodes 134, the pattern or the word arranged by the sectional electrodes 134 can be seen outside the light transmissive pattern portion 137. That is to say, when the bright electrophoretic particles 142 are adjacent to the light transmissive pattern portion 137, the display region 132 of the electrophoretic display module 130 can display the pattern or the word arranged by the sectional electrodes 134. In addition, the protection film 139 may be a colored polymer protection film to generate colors. The colored polymer protection film may include an anti-glare film, an anti-reflection film, an ultraviolet isolation film, a water vapor isolation film, or an anti-scratch film.

It is to be noted that the aforementioned elements and the connection relationship of the elements will not be repeated.

In the following description, methods for detachably positioning the second casing 122 to the first casing 112 will be described.

Figure 4:
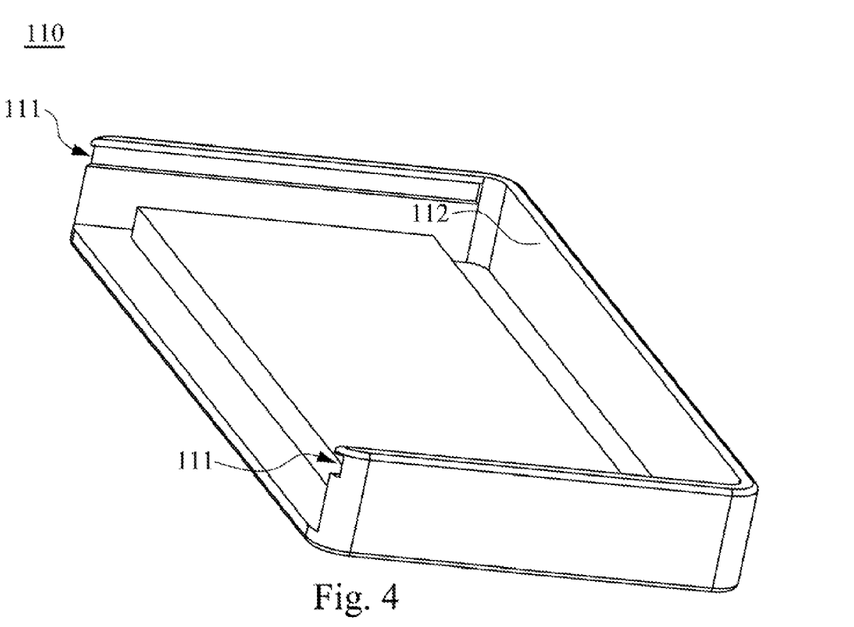
FIG. 4 is a partial perspective view of a first casing shown in FIG. 1.
Figure 5:
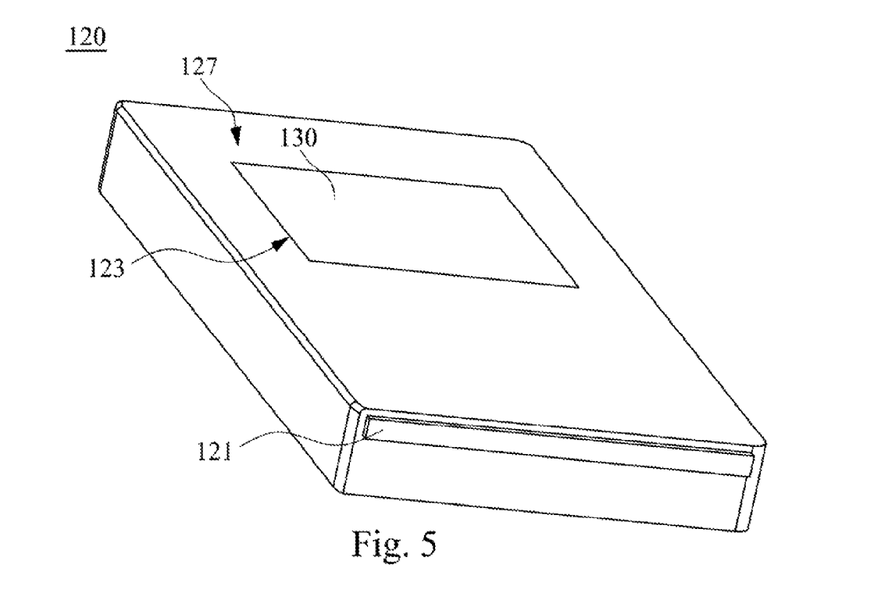
FIG. 5 is a partial perspective view of a second casing shown in FIG. 1.

FIG. 4 is a partial perspective view of the first casing 112 shown in FIG. 1. FIG. 5 is a partial perspective view of the second casing 122 shown in FIG. 1. As shown in FIG. 1, FIG. 4, and FIG. 5, each of two opposite edges of the first casing 122 of the main device 110 has a groove 111. Each of two opposite edges of the second casing 122 of the detachable display module 120 has a protruding rib 121, and the two protruding ribs 121 are respectively coupled to the two grooves 111. When the second casing 122 is assembled to the first casing 112, the protruding rib 121 of the second casing 122 can insert into the groove 111 of the first casing 112 in a direction D1, such that the second casing 122 is slidingly connected to the first casing 112. As such a design, the second casing 122 can be detachably positioned on the first casing 112.

Since the electrophoretic display module 130 is fixed to the second casing 122, and the second casing 122 of the detachable display module 120 is detachably positioned on the first casing 112 of the main device 110, when users desire to change the pattern or the word displayed by the electrophoretic display module 130, the pattern or the word displayed by the electrophoretic display module can be changed by changing another detachable display module 120.

Figure 6:
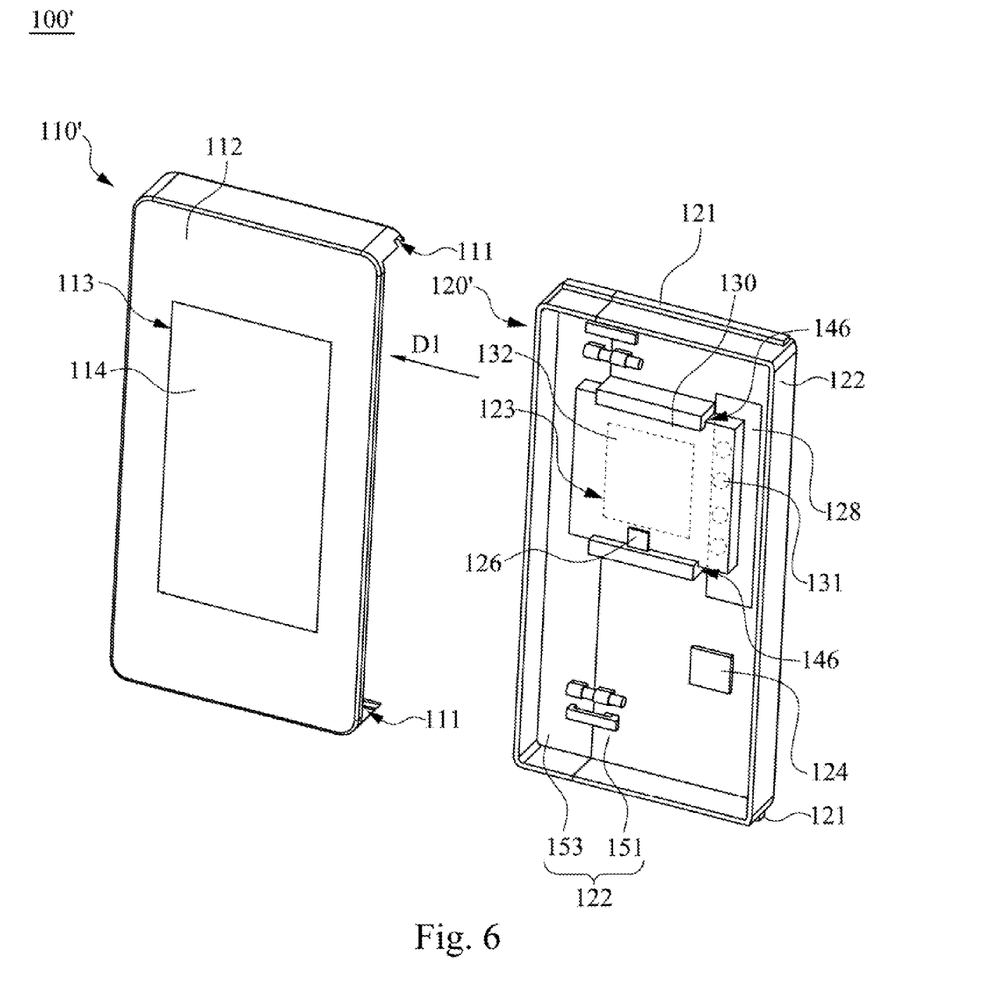
FIG. 6 is an exploded view of a dual screen electronic device according to an embodiment of the present invention.
Figure 7:
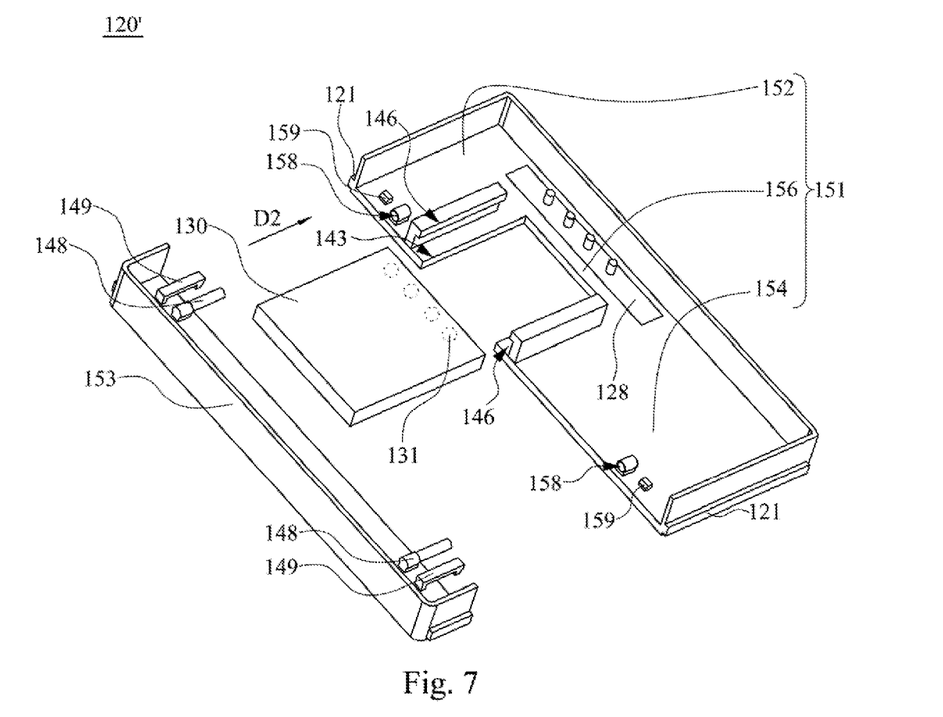
FIG. 7 is an exploded view of a detachable display module shown in FIG. 6.

FIG. 6 is an exploded view of a dual screen electronic device 100' according to an embodiment of the present invention. FIG. 7 is an exploded view of a detachable display module 120' shown in FIG. 6. As shown in FIG. 6 and FIG. 7, the dual screen electronic device 100' includes a main device 110' and the detachable display module 120'. The difference between this embodiment and the embodiment shown in FIG. 1 and FIG. 2 is that the electrophoretic display module 130 is detachably positioned on the second casing 122, and the control module 126 is located on the electrophoretic display module 130.

In this embodiment, the second casing 122 includes a first sub-portion 151 and a second sub-portion 153. The first sub-portion 151 has a concave portion 143. Two ends of the second sub-portion 153 are respectively detachably connected to the first sub-portion 151, and the second sub-portion 153 is located on an opening position of the concave portion 143, such that an second opening 123 is formed between the first and second sub-portions 151, 153. Furthermore, each of two opposite edges of the concave portion 143 has a groove 146, and the two grooves 146 are respectively coupled to two opposite edges of the electrophoretic display module 130, such that the electrophoretic display module 130 is slidingly connected to the first sub-portion 151 of the second casing 122.

Figure 8:
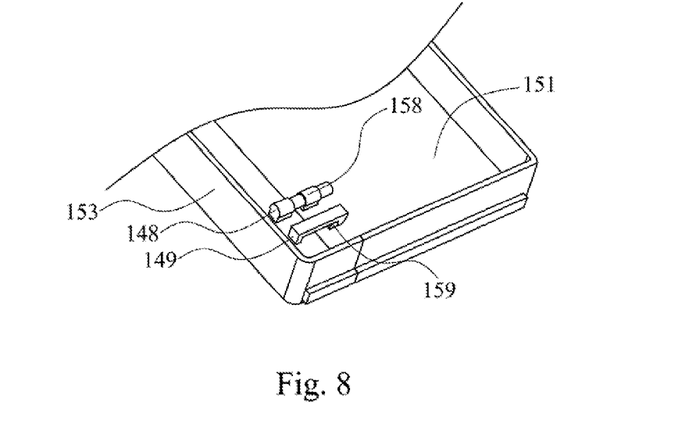
FIG. 8 is a partial enlarged view of a first sub-portion and a second sub-portion shown in FIG. 7 when being assembled.

FIG. 8 is a partial enlarged view of the first sub-portion 151 and the second sub-portion 153 shown in FIG. 7 when being assembled. As shown in FIG. 7 and FIG. 8, the first sub-portion 151 has a first board body 152, a second board body 154, and a third board body 156. The first, second, and third board bodies 152, 154, 156 surround the concave portion 143, and the first board body 152 is substantially parallel to the second board body 154. The first sub-portion 151 has a plurality of positioning through holes 158 and positioning protruding points 159. The positioning through holes 158 and the positioning protruding points 159 are located on the first and second board bodies 152, 154. The second sub-portion 153 has a plurality of positioning pillars 148 and fastening hooks 149.

During assembly of the electrophoretic display module 130, the electrophoretic display module 130 can be moved in a direction D2 and coupled to the groove 146, such that the electrode pads 131 of the electrophoretic display module 130 can electrically contact the signal connection device 128 of the first sub-portion 151. Next, the second sub-portion 153 can be moved in the direction D2, such that the positioning pillars 148 of the second sub-portion 153 respectively insert into the positioning through holes 158 of the first sub-portion 151, and the fastening hooks 149 of the second sub-portion 153 are respectively fixed to the positioning protruding points 159 of the first sub-portion 151. Therefore, the electrophoretic display module 130 is detachably positioned on the second casing 122.

Referring back to FIG. 6, in order to change the pattern or the word displayed by the electrophoretic display module 130, when the electrophoretic display module 130 is detachably positioned on the second casing 122, the whole detachable display module 120' does not need to be changed, only the electrophoretic display module 130 located on the second casing 122 needs to be changed.

Figure 9:
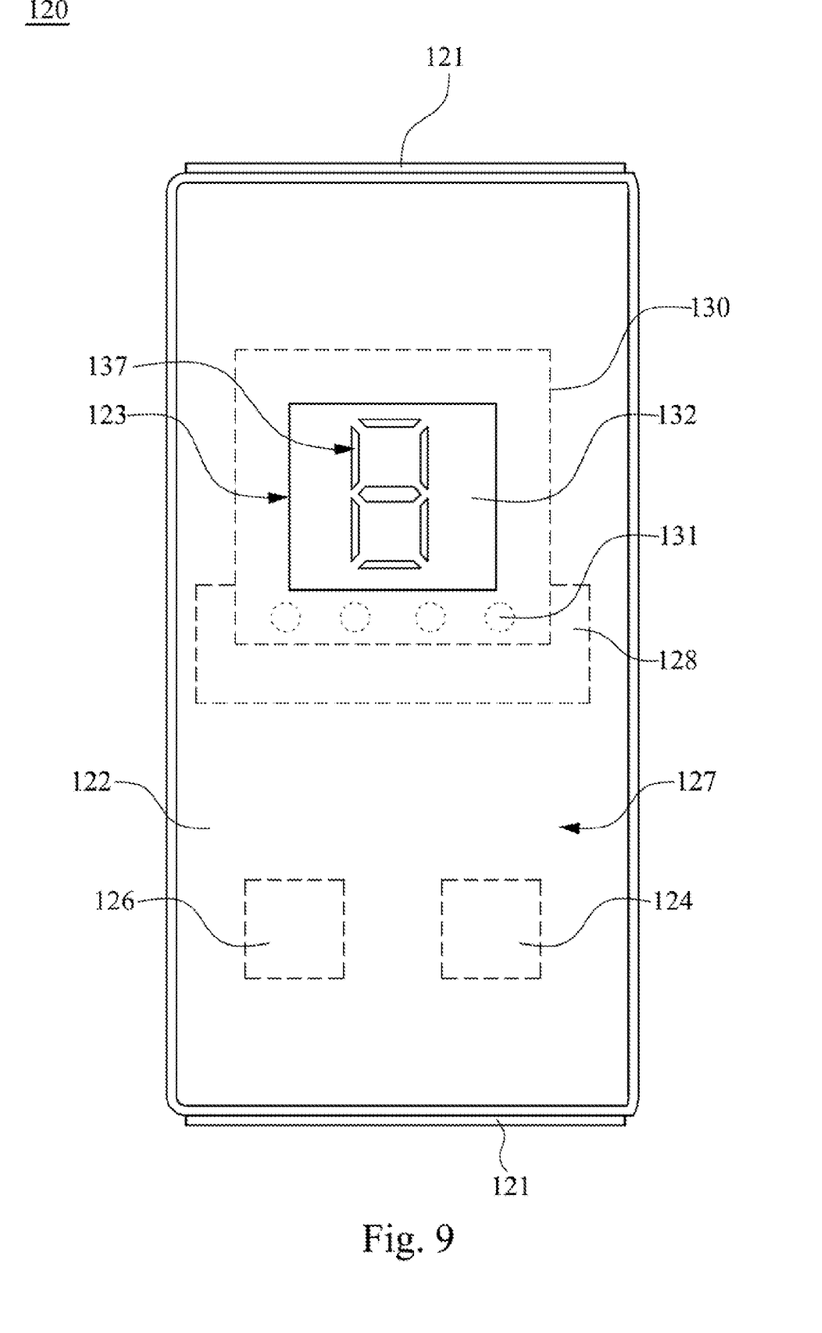
FIG. 9 is a front view that is seen from an external surface of a detachable display module when being used according to an embodiment of the present invention.

FIG. 9 is a front view that is seen from an external surface 127 of a detachable display module 120 when being used according to an embodiment of the present invention. As shown in FIG. 3 and FIG. 9, the shape of the light transmissive pattern portion 137 of the protection film 139 and the sectional electrodes 134 are arranged as a number "8". When the control module 126 controls the electric field of the display medium layer 136, the bright electrophoretic particles 142 are adjacent to the light transmissive pattern portion 137. As a result, the electrophoretic display module 130 can reflect an environmental incident light so as to display the number "8" as a bright face.

Figure 10:
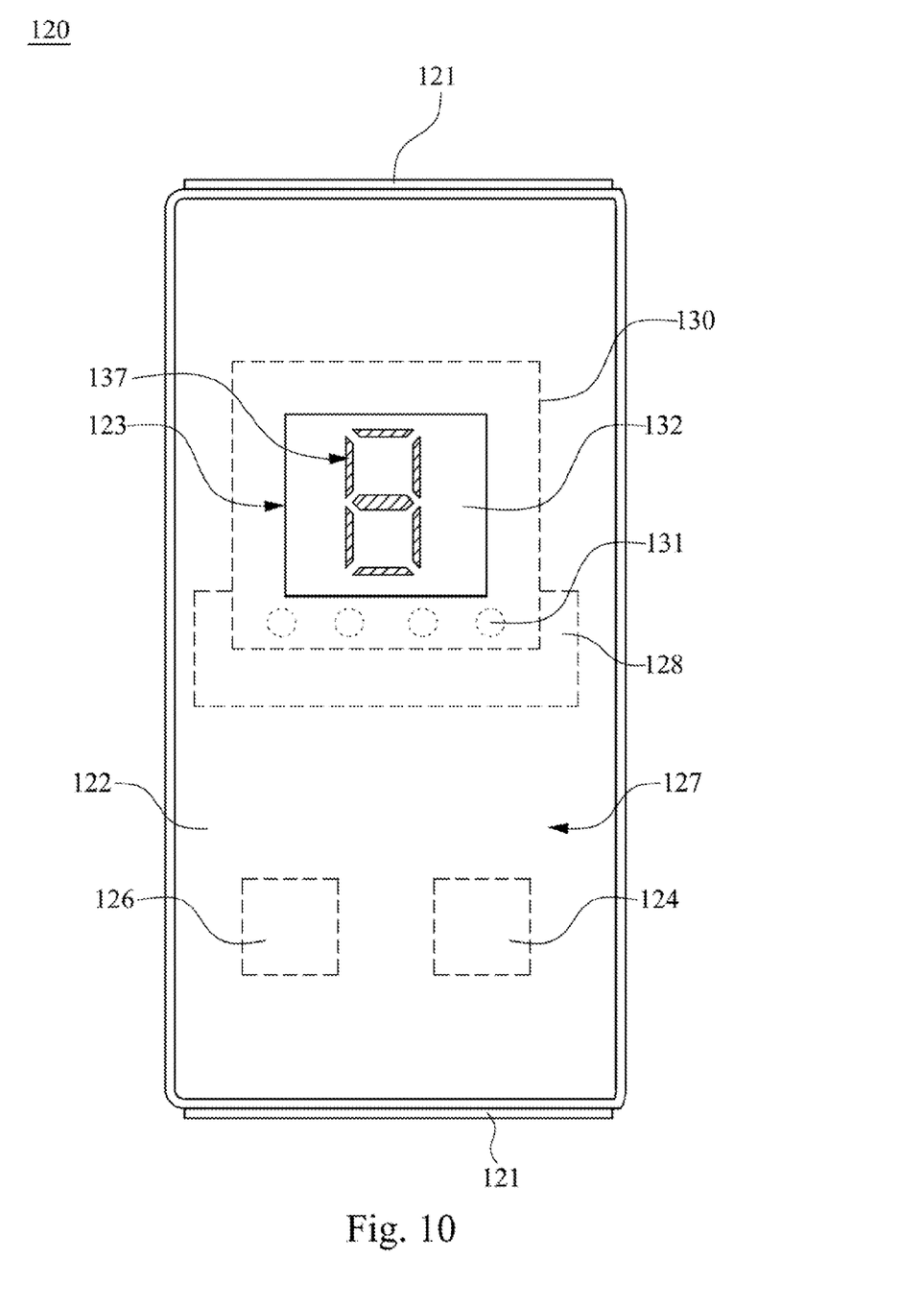
FIG. 10 is another usage state of the detachable display module shown in FIG. 9.

FIG. 10 is another usage state of the detachable display module 120 shown in FIG. 9. As shown in FIG. 3 and FIG. 10, when the control module 126 controls the electric field of the display medium layer 136, the dark electrophoretic particles 144 are adjacent to the light transmissive pattern portion 137. As a result, the electrophoretic display module 130 cannot reflect an environmental incident light, such that the number "8" is a dark face (i.e., an oblique line region shown in FIG. 10).

As shown in FIG. 9 and FIG. 10, the control module 126 can change the electric field of the display medium layer 136, such that the number "8" displays alternate variation with the bright and dark faces. Moreover, positive and negative levels of each of the sectional electrodes 134 can also be independently controlled by the control module 126, such that each of the light transmissive pattern portion 137 can display as a bright face or a dark face. Therefore, the detachable display module 130 is vivid.

Figure 11:
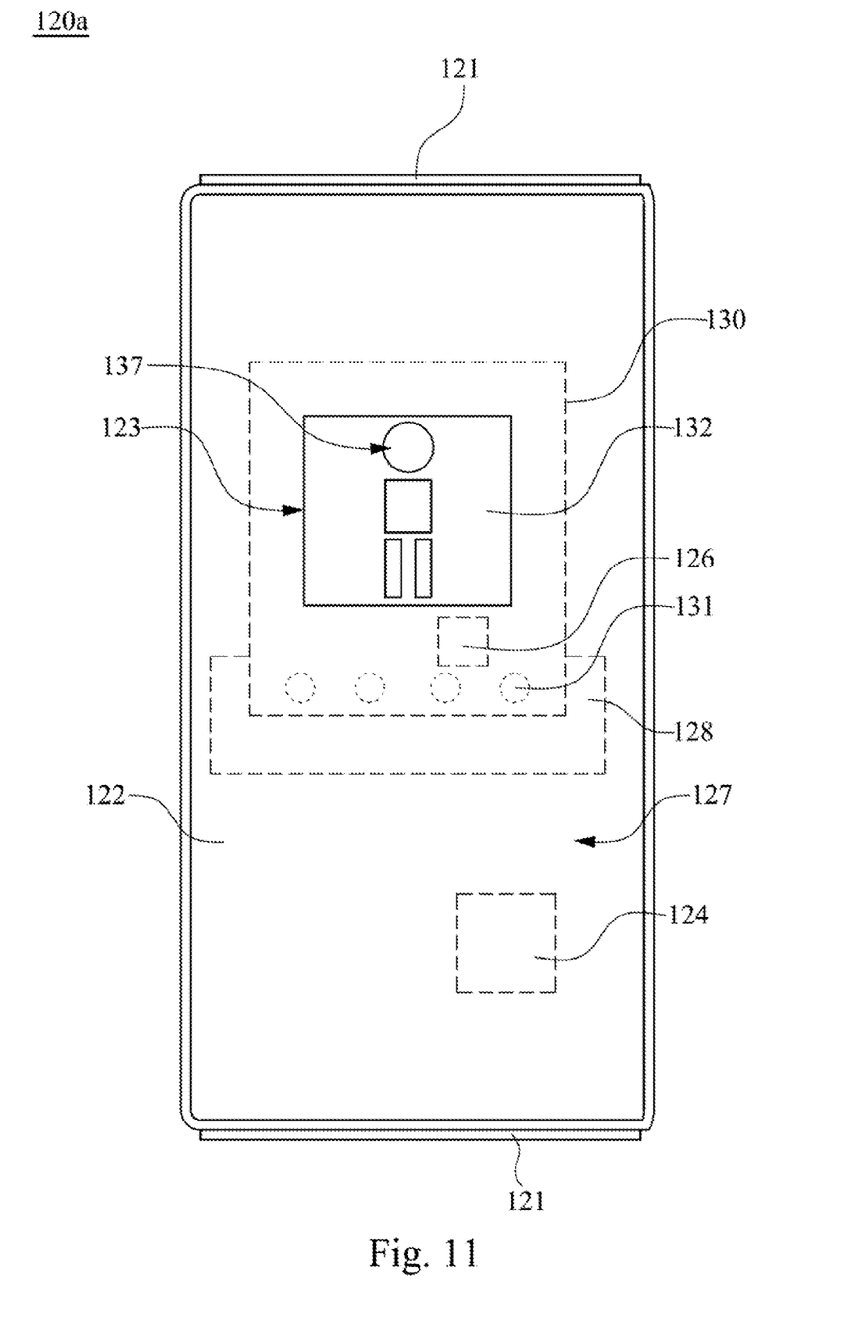
FIG. 11 is a front view that is seen from an external surface of a detachable display module when being used according to an embodiment of the present invention.

FIG. 11 is a front view that is seen from an external surface 127 of a detachable display module 120a when being used according to an embodiment of the present invention. As shown in FIG. 3 and FIG. 11, the shape of the light transmissive pattern portion 137 of the protection film 139 and the sectional electrodes 134 are arranged as a person-shaped pattern. When the control module 126 controls the electric field of the display medium layer 136, the bright electrophoretic particles 142 are adjacent to the light transmissive pattern portion 137. As a result, the electrophoretic display module 130 can reflect an environmental incident light so as to display the person-shaped pattern as a bright face.

Figure 12:
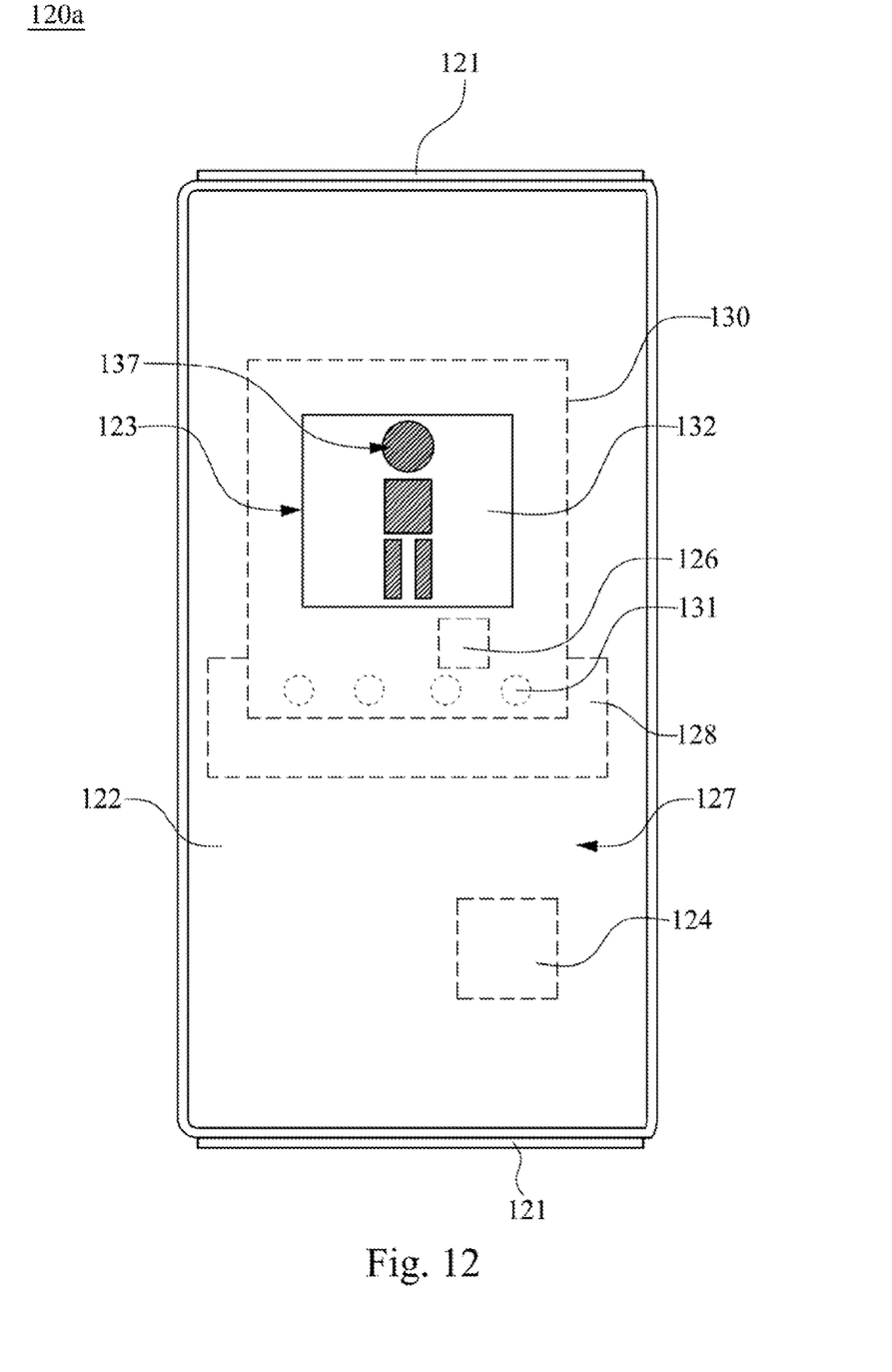
FIG. 12 is another usage state of the detachable display module shown in FIG. 11.

FIG. 12 is another usage state of the detachable display module 120a shown in FIG. 11. As shown in FIG. 3 and FIG. 12, when the control module 126 controls the electric field of the display medium layer 136, the dark electrophoretic particles 144 are adjacent to the light transmissive pattern portion 137. As a result, the electrophoretic display module 130 cannot reflect an environmental incident light, such that the person-shaped pattern is a dark face (i.e., an oblique line region shown in FIG. 12).

Figure 13:
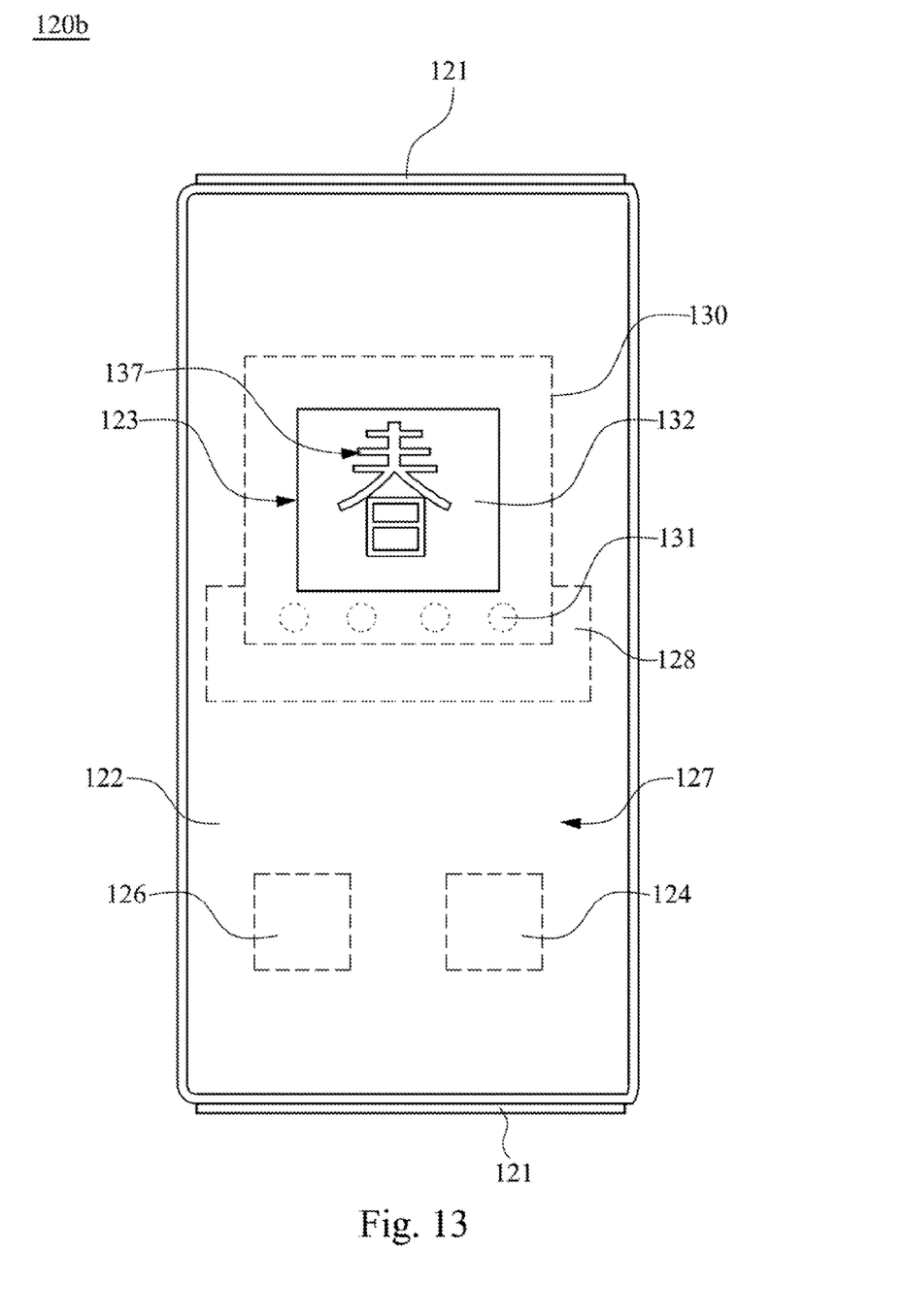
FIG. 13 is a front view that is seen from an external surface of a detachable display module when being used according to an embodiment of the present invention.

FIG. 13 is a front view that is seen from an external surface 127 of a detachable display module 120b when being used according to an embodiment of the present invention. As shown in FIG. 3 and FIG. 13, the shape of the light transmissive pattern portion 137 of the protection film 139 and the sectional electrodes 134 are arranged as a word " ※ ". When the control module 126 controls the electric field of the display medium layer 136, the bright electrophoretic particles 142 are adjacent to the light transmissive pattern portion 137. As a result, the electrophoretic display module 130 can reflect an environmental incident light so as to display the word " ※ " as a bright face.

Figure 14:
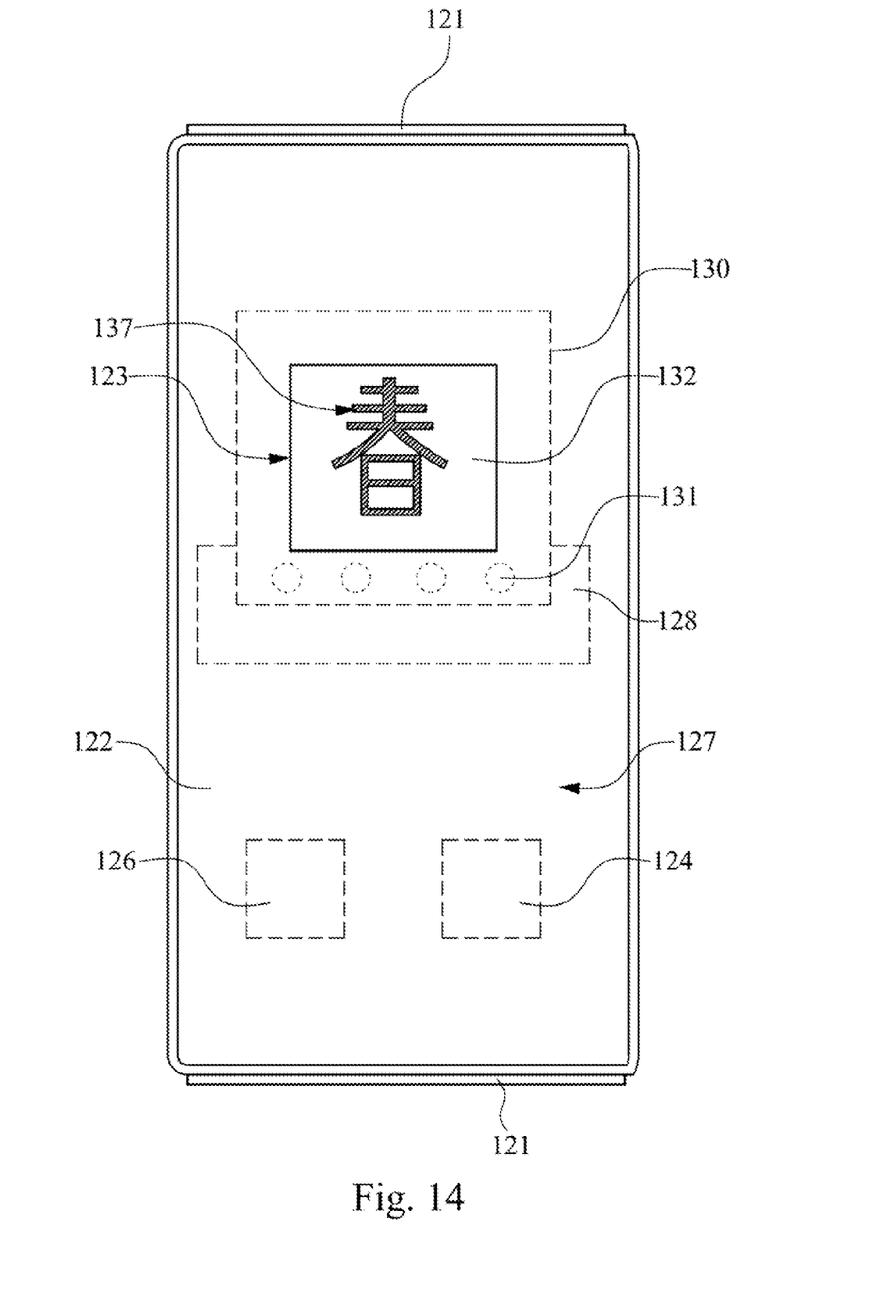
FIG. 14 is another usage state of the detachable display module shown in FIG. 13.

FIG. 14 is another usage state of the detachable display module 120b shown in FIG. 13. As shown in FIG. 3 and FIG. 13, when the control module 126 controls the electric field of the display medium layer 136, the dark electrophoretic particles 144 are adjacent to the light transmissive pattern portion 137. As a result, the electrophoretic display module 130 cannot reflect an environmental incident light, such that the word " ※ " is a dark face (i.e., an oblique line region shown in FIG. 14).

Compared with a conventional plastic housing having a printing pattern, the detachable display module can display a pattern or a word with variations of bright, dark, and colors, so that the detachable display module is more vivid. In addition, the pattern or the word can be easily changed by changing the detachable display module or the electrophoretic display module of the detachable display module. Moreover, the detachable display module not only can be used in the main device of the electronic device, but also can be used in a spring festival couplets, a product tag, a business card, a photo frame, a desktop calendar, a public region guidelines nameplate, and a personal table insignia.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A dual screen electronic device comprising:
    a main device comprising:
        a first casing having a first opening, wherein each of two opposite edges of the first casing has a groove; and
        a display screen located on the first casing and exposed from the first opening; and
    a detachable display module comprising:
        a second casing detachably positioned on the first casing, wherein the second casing has a second opening, and each of two opposite edges of the second casing has a protruding rib, and the two protruding ribs are respectively coupled to the two grooves, such that the second casing is slidingly connected to the first casing;
        a power supply module arranged on the second casing;
        an electrophoretic display module fixed to the second casing or detachably positioned on the second casing, wherein the electrophoretic display module has a display region exposed from the second opening; when the second casing is positioned on the first casing through the two protruding ribs and the two grooves, an orthogonal projection of the electrophoretic display module on the first casing overlaps the display screen, and a first display surface of the display screen faces away from a second display surface of the electrophoretic display module; and a control module selectively located on the second casing or located on the electrophoretic display module, wherein the control module is electrically connected to the electrophoretic display module and the power supply module.

2. The dual screen electronic device as claimed in claim 1, wherein the electrophoretic display module comprises:
a substrate;
a plurality of sectional electrodes located on the substrate and arranged to be a pattern or a word;
a common electrode layer;
a display medium layer located between the common electrode layer and the sectional electrodes; and
a plurality of electrode pads electrically connected to the sectional electrodes and the common electrode layer.

3. The dual screen electronic device as claimed in claim 2, wherein the detachable display module further comprises:
a signal connection device configured on the second casing and electrically connected to the control module for electrically contacting the electrode pads.

4. The dual screen electronic device as claimed in claim 2, wherein the detachable display module further comprises:
a protection film located on the common electrode layer, wherein the protection film has at least one light transmissive pattern portion located above the sectional electrodes.

5. The dual screen electronic device as claimed in claim 2, wherein the display medium layer comprises:
a plurality of microcapsules, wherein each of the microcapsules has a plurality of bright electrophoretic particles and a plurality of dark electrophoretic particles, such that the pattern or the word displays as a bright face or a dark face.

6. The dual screen electronic device as claimed in claim 1, wherein the second casing comprises:
a first sub-portion having a concave portion; and
a second sub-portion, wherein two ends of the second sub-portion are respectively detachably connected to the first sub-portion, and the second sub-portion is located on an opening position of the concave portion, such that an second opening is formed between the first and second sub-portions.

7. The dual screen electronic device as claimed in claim 6, wherein each of two opposite edges of the concave portion has a groove, and the two grooves are respectively coupled to two opposite edges of the electrophoretic display module, such that the electrophoretic display module is slidingly connected to the first sub-portion.

8. The dual screen electronic device as claimed in claim 6, wherein the first sub-portion has a first board body, a second board body, and a third board body, and the first, second, and third board bodies surround the concave portion, and the first board body is parallel to the second board body.

9. The dual screen electronic device as claimed in claim 8, wherein the first sub-portion has a plurality of positioning through holes located on the first and second board bodies, and the second sub-portion has a plurality of positioning pillars, and the positioning pillars respectively insert into the positioning through holes.

10. The dual screen electronic device as claimed in claim 8, wherein the first sub-portion has a plurality of positioning protruding points located on the first and second board bodies, and the second sub-portion has a plurality of fastening hooks, and the fastening hooks are respectively fixed to the positioning protruding points.

11. The dual screen electronic device as claimed in claim 1, wherein the control module comprises a micro control unit and a driving unit.

12. A detachable display module assembled to a main device that has a first casing and a display screen, wherein the display screen is located on the first casing and exposed from a first opening of the first casing, and each of two opposed edges of the first casing has a groove and the detachable display module comprises:
a second casing detachably positioned on the first casing, wherein the second casing has a second opening, and each of two opposite edges of the second casing has a protruding rib, and the two protruding ribs are respectively coupled to the two grooves, such that the second casing is slidingly connected to the first casing;
a power supply module arranged on the second casing;
an electrophoretic display module fixed to the second casing or detachably positioned on the second casing, wherein the electrophoretic display module has a display region exposed from the second opening; when the second casing is positioned on the first casing through the two protruding ribs and the two grooves, an orthogonal projection of the electrophoretic display module on the first casing overlaps the display screen, and a first display surface of the display screen faces away from a second display surface of the electrophoretic display module; and
a control module selectively located on the second casing or located on the electrophoretic display module, wherein the control module is electrically connected to the electrophoretic display module and the power supply module.

* * * * *